J. C. Rhodes.
Malt Dryer.
N° 92,096. Patented Jun. 29, 1869.
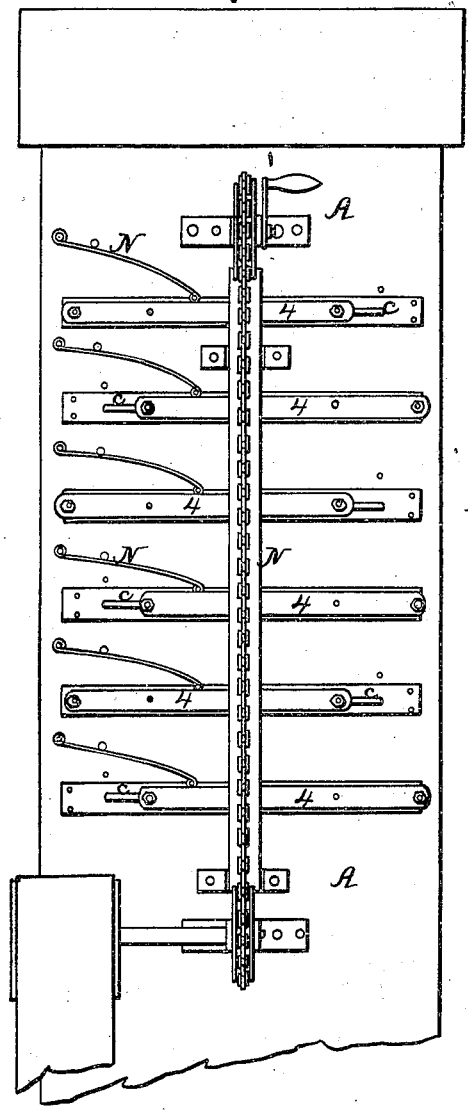
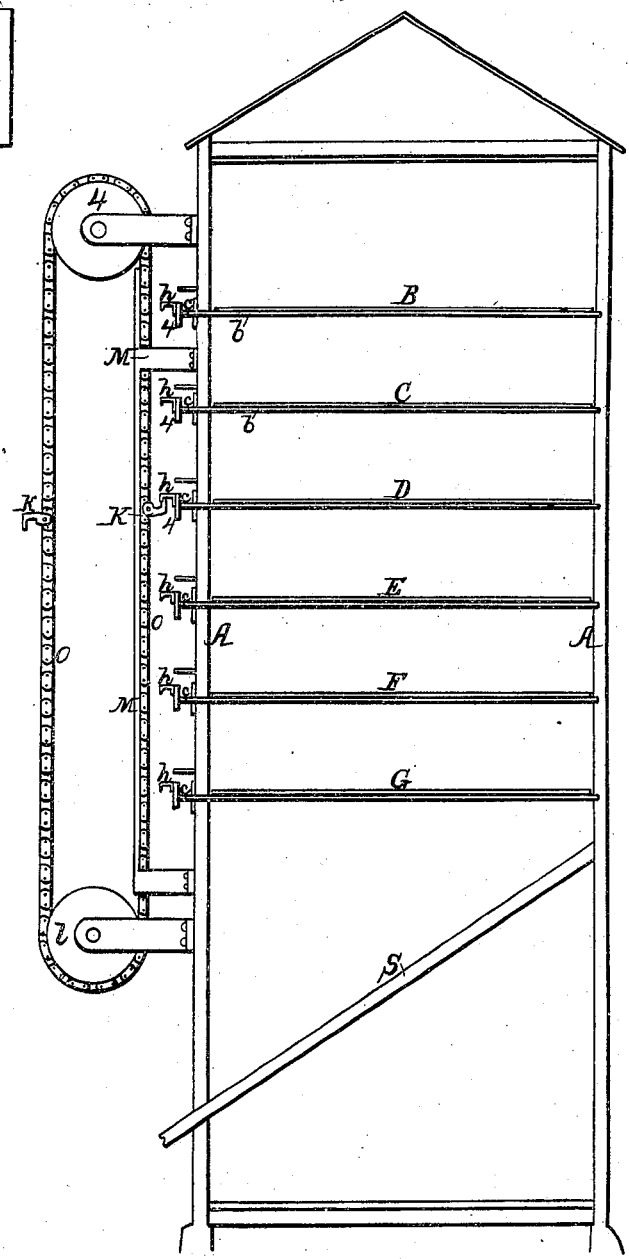
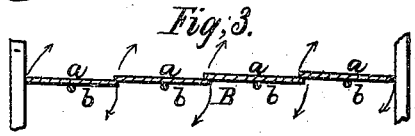
Witnesses.
J. B. Funkin.
G. A. Mariner.
Inventor.
John C. Rhodes

United States Patent Office.

JOHN C. RHODES, OF CHICAGO, ILLINOIS.

Letters Patent No. 92,096, dated June 29, 1869.

---

IMPROVED DEVICE TO OPERATE THE TILTING FLOORS OF MALT-KILNS.

---

The Schedule referred to in these Letters Patent and making part of the same.

---

*To all whom it may concern:*

Be it known that I, JOHN C. RHODES, of the city of Chicago, in the county of Cook, and State of Illinois, have invented certain new and useful Improvements in "Device to Operate the Tilting Floors of Malt-Kilns, &c.;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in an improved device adapted for the operation of the floors of malt-kilns, such as the floors of the kiln invented by Joseph Gesmen, for which Letters Patent were issued, on September 17, 1867.

The device may also be used for all kinds of floors, consisting of several strips, working on pivots, for the purpose of tilting said strips and unloading the floor loaded with grain, or other substances, at once.

A is the wall of the building.

B C D E F G are the floors, each consisting of a series of strips, *a a*, of perforated sheet-metal, or otherwise arranged.

*b b* are rods, on which said strips pivot.

The rods are journalled in walls or partitions of the building, and their ends protruding beyond said walls or partitions, are shaped into or provided with cranks, *c c*, which cranks are connected by plates or bars H H. Ordinarily, these bars, and through them the floors, are operated by hand, by means of long levers, the short arms of which are connected with said bars H H, and the long arms extend down to the ground, there being as many levers as there are floors; the disadvantage of this arrangement being that sometimes mistakes occur in the handling of the levers, and the grain from the wrong floor is precipitated down, which makes a great annoyance in a malt-kiln.

My improvement consists in a device by which the floors are tilted one after the other, without fail, and which may be operated by hand, or by any motive-power.

It consists in the following:

Bars H H are provided with flanges *h h*. An endless chain, O, provided with one or more lugs or catches, K, is passed around pulleys, L L, operated by crank-handles or belts connected with steam or water-power.

M is a guide, for the purpose of keeping the chain at a proper distance from the wall, and facilitating the operation of catches K on flanges *h*.

The arms supporting the pulleys and the guide are suitably secured to the building.

N N are springs secured to the wall, and bearing on the bars H H, for the purpose of keeping them in place, and bringing them into original position, after they have been raised by the catch of the chain O. Weights may answer for springs.

The operation consists in this, that in a malt-kiln, when all the floors are loaded with grain, the part of the chain close to the wall, moving upward, the catch K tilts the floors one after the other, commencing with the lower floor.

By this operation, the grain of the lower floor is precipitated upon the chute S, and other grains change the floors, so that the upper floor becomes clear and is ready for loading.

Having thus described my invention,

What I claim as new, and desire to secure by Letters Patent, is—

The device, consisting of the endless chain O, catch or catches K, and guide M, all arranged and operating substantially as herein set forth and specified.

JOHN C. RHODES.

Witnesses:
J. B. TURCHIN,
G. A. MARINER.